Feb. 8, 1955   A. H. FREDRICK   2,701,841
RANGE UNIT

Filed Oct. 10, 1945   3 Sheets-Sheet 1

FIG. I

INVENTOR
ARDEN H. FREDRICK
BY
ATTORNEY

Feb. 8, 1955   A. H. FREDRICK   2,701,841
RANGE UNIT

Filed Oct. 10, 1945   3 Sheets-Sheet 3

INVENTOR
ARDEN H. FREDRICK

BY

ATTORNEY

United States Patent Office 2,701,841
Patented Feb. 8, 1955

2,701,841

RANGE UNIT

Arden H. Fredrick, Boston, Mass., assignor, by mesne assignments, to the United States of America as represented by the Secretary of the Navy Application October 10, 1945, Serial No. 621,574

2 Claims. (Cl. 250—27)

This invention relates to range units and more particularly to a precision range unit adapted for use in a radar system.

In certain types of radar system installations, particularly where several automatic tracking radar systems are to be operated in the vicinity of one another, a non-synchronized triggering source is practically essential, since the effect of several similar adjacent radar systems, each with its pulse repetition frequency accurately synchronized to its own crystal oscillator, is to create several slightly different precisely maintained pulse repetition frequencies. The several main or transmitted radar pulses will then move slowly across the cathode ray screen of each radar system, resulting in confusing the visual picture pattern and also disrupting the automatic tracking function of the radar system. From this the need for a non-synchronized pulse repetition frequency is evident, or in other words, it is required that the time interval between successive transmitted pulses from a single radar system show slight variations. Nevertheless, it is also required that for accurate ranging any one transmitted pulse shall be accurately located with respect to a crystal oscillator output pulse.

Accordingly, it is one object of this invention to provide a precision range unit adapted for use in a radar system.

Another object is to provide a crystal oscillator controlled precision range unit to be triggered from an external non-synchronized trigger source.

Other and further objects will appear in the course of the following description when taken with the accompanying drawings in which.

Figure 1:
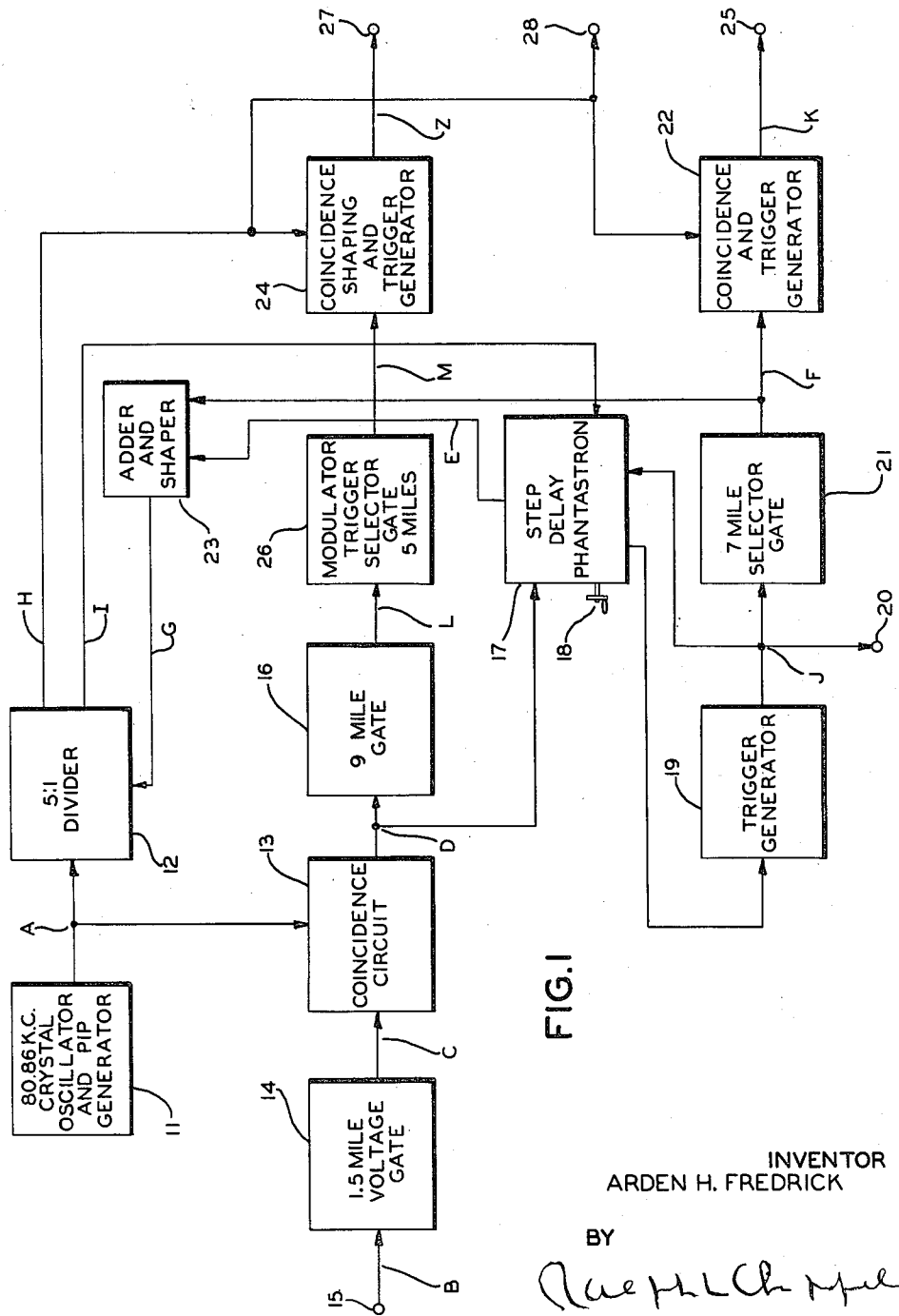
Fig. 1 illustrates in block diagram form one embodiment of this invention.
Figure 2:
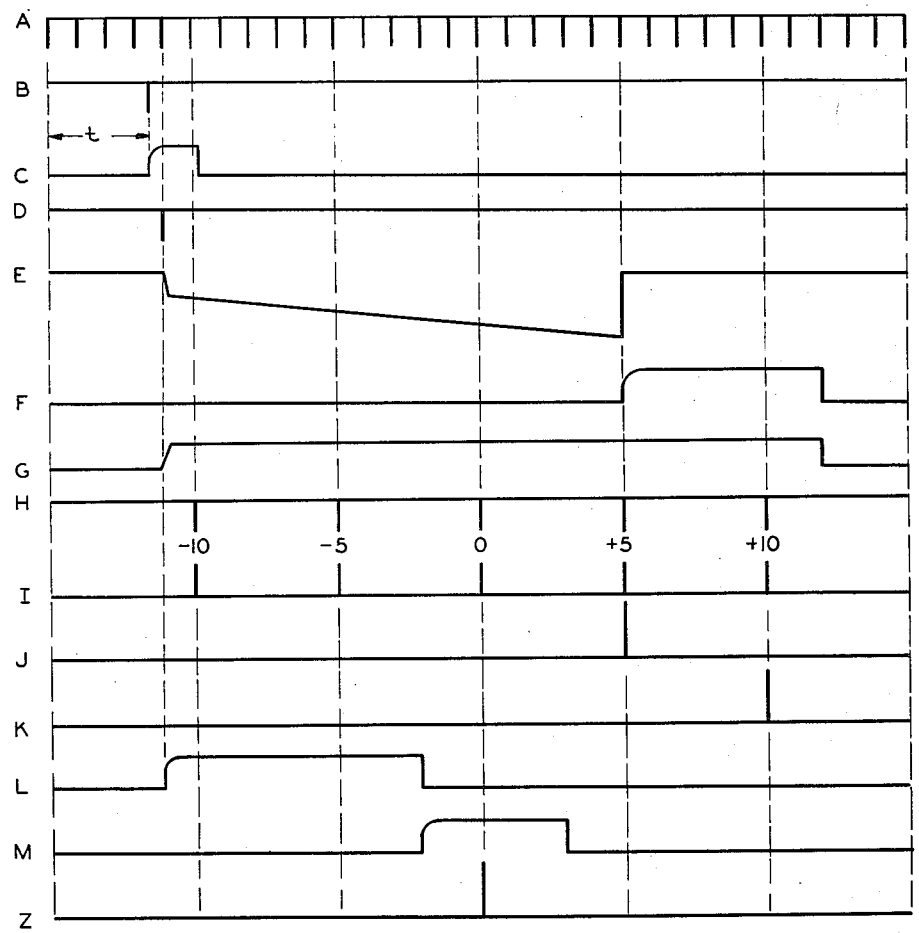
Fig. 2 shows the pertinent waveforms associated with the embodiment of Fig. 1.
Figure 3:
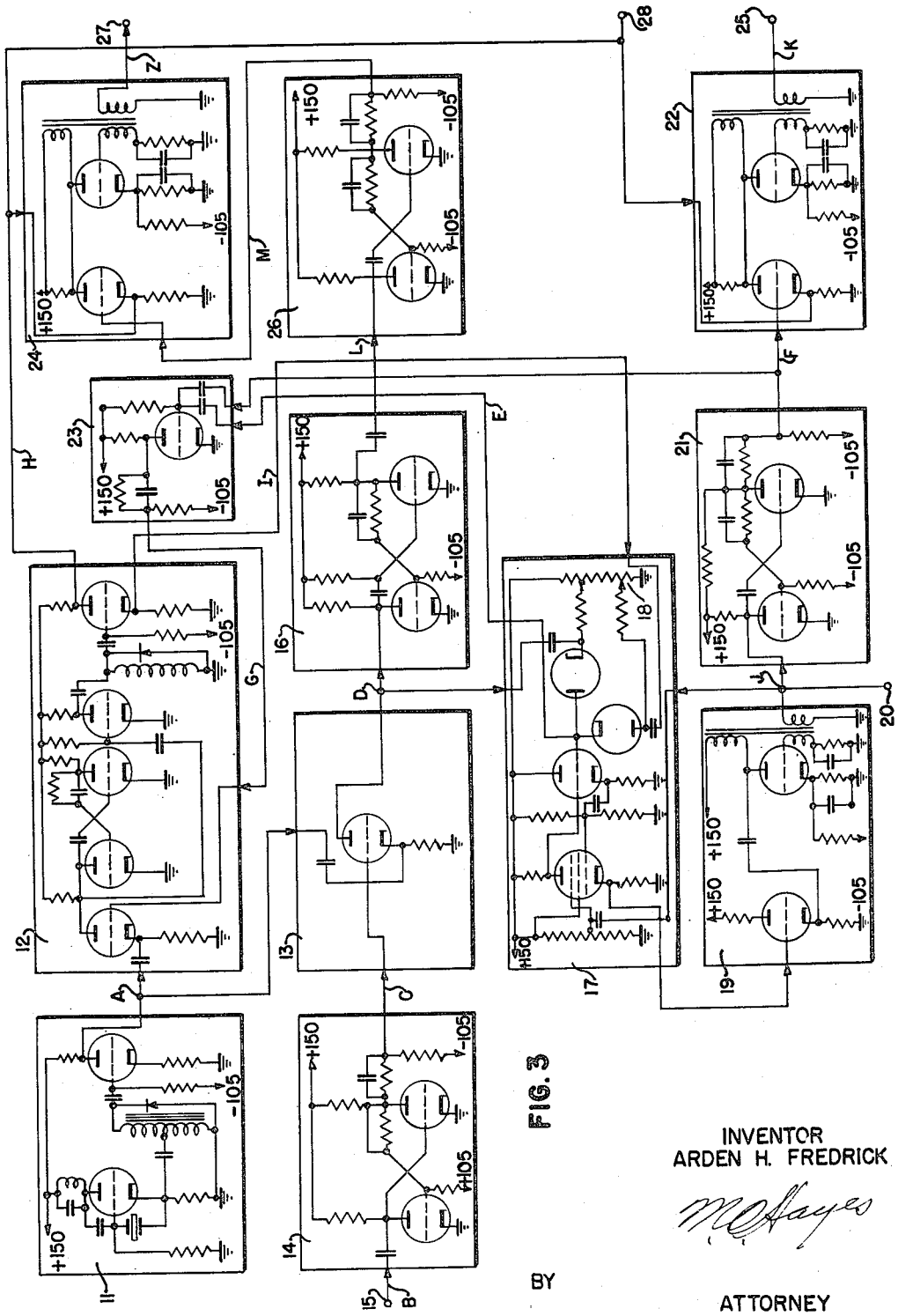
Fig. 3 illustrates by a detailed circuit diagram the conventional methods by which the functions of block diagram, Fig. 1, may be obtained.

Considering the drawings, an 80.86 kc. crystal oscillator pip generator 11 in Fig. 1 and Fig. 3 serves as a source of negative voltage pulses separated on a time base by an interval corresponding to exactly one nautical mile of range, as represented by the waveforms of line A in Fig. 2. It is to be understood that the word mile as hereinafter used in this specification means nautical mile. These precisely timed voltage pulses, hereinafter called one mile pulses, are connected to the inputs of five-to-one divider circuit 12 and coincidence circuit 13 as shown in Fig. 1 and Fig. 3. To a second input of circuit 13 is connected the output of 1.5 mile voltage gate circuit 14. The term "voltage gate" as here and hereinafter used in this specification denotes a voltage pulse used for gating, enabling, or otherwise controlling a succeeding circuit. Circuit 14 provides a voltage gate output as represented by the waveform of line C in Fig. 2 in response to a negative input trigger connected to input terminal 15 of Fig. 1 and Fig. 3. This input trigger, which in the waveform diagram of line B in Fig. 2 is shown as occurring at some time "t," is supplied by an external pulse repetition frequency circuit for the radar system which is asynchronized with the output of pipe generator 11 of Fig. 1 and Fig. 3. The length of the voltage gate output of circuit 14 is chosen so as to insure that some part of the voltage gate will be coincident at its maximum value with one of the one mile pulses. If the leading and trailing edges of this gate output were both vertical, this voltage gate could be shortened to one of one mile duration, but since, as illustrated by the waveform of line C (Fig. 2), this can not be insured with simple gate circuits, a time duration of 1.5 miles has been chosen. To show the necessity for this, if time "t" happened to be slightly longer than shown, the first one mile pulse would occur when the leading edge of the voltage gate was still rising and coincidence circuit 13 would furnish no output, but the next one mile pulse would occur when the voltage gate had attained its maximum magnitude, resulting in coincidence circuit 13 furnishing an output. It is immaterial exactly which one mile pulse causes this output from circuit 13. For this discussion with the time "t" chosen as shown, it will be the first one mile pulse occurring after the negative trigger of line B (Fig. 2), and the output pulse of circuit 13 will be negative and of course coincident with the last-mentioned one mile pulse as illustrated by waveform D of Fig. 2. This negative output pulse then triggers nine mile gate circuit 16 (Fig. 1 and Fig. 3) and also step delay phantastron circuit 17, such as is disclosed in a copending application Serial No. 631,954 for a "Pip Selector," filed November 30, 1945 by Roger B. Woodbury, now United States Patent No. 2,579,214, issued May 20, 1952. Briefly this phantastron works as follows: a negative pulse impressed on the plate of its tube causes the plate voltage to drop first sharply and then along a straight line characteristic, as shown by waveform E of Fig. 2, due to feedback between the control grid and plate circuits. The output of this plate circuit will hereinafter be termed the range voltage gate. This plate waveform and range voltage gate may be terminated as desired by a positive pulse applied to the plate circuit. This last-mentioned positive pulse will be one of a series of five mile pulses hereinafter described, and the time at which one of these five mile pulses terminates the range voltage gate is controlled by the D. C. voltage level of the positive pulse circuit, which is in turn controlled by a range device, in this case the setting of a range potentiometer, whose control is diagrammatically indicated in Fig. 1 by handwheel 18. As is obvious to those skilled in the art, this range control voltage could be controlled in a number of other ways as desired. A small positive pulse then appears at the cathode of this phantastron tube coincident in time with the above-mentioned positive five mile pulse which terminates the range voltage gate and will hereinafter be termed the terminating pulse. This terminating pulse triggers a trigger generator circuit 19 of Fig. 1 and Fig. 3 to produce a first range pulse output, represented by the waveform of line J in Fig. 2, which is connected to output terminal 20 (Fig. 1 and Fig. 3), to seven mile selector gate circuit 21, and to the suppressor grid of the phantastron tube to insure the termination of its waveforms and make their trailing edges relatively steep. The output of circuit 21 is a voltage gate whose time duration corresponds to seven miles of range, as shown by the waveform of line F in Fig. 2 and this voltage gate is applied to one input of coincidence and trigger generator circuit 22 and to one input of adder and shaper circuit 23. The above-described range voltage gate is connected to another input of adder and shaper circuit 23, whose construction is well-known to those skilled in the art and whose function is to produce a uniform or constant amplitude output voltage gate whose time duration is equal to the sum of the time durations of the individual input voltage gates. This output voltage gate, which is represented by the waveform of line G in Fig. 2, is connected to a second input of divider circuit 12 and serves as a gating or enabling means for that circuit. Due to the slow rise of the leading edge of the waveform of line G in Fig. 2 and the corresponding voltage gate, divider circuit 12 will not produce an output until the next one mile pulse after the start of the output voltage gate occurs. The output of circuit 12 is separated into two channels giving negative and positive five mile pulses respectively, coincident in time relationship with one another as represented by the waveforms of lines H and I respectively of Fig. 2. The first five mile pulse is represented in the waveforms of lines H and I by the pulse marked "—10." Thereafter as long as the enabling output voltage gate represented by line G continues, a coincident negative and positive pulse will be produced at the output of divider circuit 12 at time intervals corresponding to exactly five miles of range. The positive pulses are connected to the plate circuit of step delay phantastron circuit 17 as above-described, and the negative pulses are connected to one input of coincidence, shaping, and trigger generator circuit 24, and to a second input of coincidence and trigger generator circuit 22 as shown in Fig. 1 and Fig. 3. Circuit 22 is designed to produce an output when a coincidence occurs between its two inputs. Due to the slow rise of the leading edge of its seven mile voltage gate input, no output will be furnished for the first coincident five mile negative pulse input (marked "+5" in line H of Fig. 2), but an output will be produced in the form of a second range pulse output at output terminal 25 as represented by the waveform of line K in Fig. 2 for the second coincident five mile pulse (the one marked "+10" in line H of Fig. 2). The output of nine mile gate circuit 16 of Fig. 1 and Fig. 3, represented by the waveform of line L in Fig. 2, triggers modulator trigger selector gate circuit 26 of Fig. 1 and Fig. 3 at the end of the nine mile voltage gate to produce a voltage gate whose time duration corresponds to five miles of range, as represented by waveform M of Fig. 2, which is applied to a second input of circuit 24. The coincidence between this five mile gate and the third five mile negative pulse (represented by the one marked "0" in line H of Fig. 2) produces a modulator pulse output at output terminal 27, represented by the waveform of line Z in Fig. 2. Thus this range unit has achieved its purpose of furnishing a precisely timed modulator pulse, a precisely timed range pulse which occurs at a time interval corresponding to (N)5 miles after the modulator pulse, where N is any integer and is controlled by the setting of the phantastron range device and handwheel 18 of Fig. 1, and a second precisely timed range pulse occurring at a time interval corresponding to 5(N+1) miles after the modulator pulse, all three pulses being synchronized with a controlling crystal oscillator and pip generator output. In the waveforms of Fig. 2, N of course is equal to one. In addition, two other five mile pulses occurring respectively ten miles and five miles before the modulator pulse are available at output terminal 28 (Fig. 1 and Fig. 3) for other uses, such as initiating sweep circuits prior to the modulator pulse, when suitable gating circuits are provided to separate them from the other five mile pulses.

It is to be understood that while the operation of the above embodiment of this invention has been described with reference to a single input trigger, the embodiment is operable with a plurality of successive input triggers. Further, while a specific embodiment has been described as required by the patent statutes, the principles of this invention are of much broader scope. Numerous additional specific applications will occur to those skilled in the art and no attempt has been made to exhaust such possibilities. The scope of the invention is defined in the following claims.

What is claimed is:

1. In a precision range unit, means for generating a series of precisely timed voltage pulses separated one from the other by a fixed predetermined time interval, means for generating a voltage gate whose duration is equal to between one and two of said predetermined time intervals in response to a trigger pulse from an external trigger source asynchronized with said pulse generating means, coincidence means which in response to said voltage gate and said precisely timed voltage pulses provide an output pulse coincident in time with the first of said precisely timed voltage pulses occurring after the start of said voltage gate, means for producing a modulator selector voltage gate of predetermined time duration occurring a fixed time after said output pulse in response to said output pulse, a phantastron circuit triggered on by said output pulse and triggered off at a time corresponding to a variable predetermined range according to the value of its range control voltage, the output of said phantastron comprising a range voltage gate whose time duration corresponds to said variable predetermined range and a terminating pulse coincident in time with the triggering off of said phantastron, a trigger generator circuit triggered by said terminating pulse to provide a first range pulse output which is also fed back to said phantastron circuit to insure its being triggered off, means providing a second selector voltage gate of predetermined time duration in response to said first range pulse output, an adder and shaper circuit, said second selector voltage gate and said range voltage gate being connected to separate inputs of said adder and shaper circuit to provide an output voltage gate whose duration is equal to the sum of the time durations of the two inputs, a divider circuit of predetermined ratio whose output consists of a submultiple of the output of said pulse generating means, said submultiple being determined by said predetermined ratio, in response to said output voltage gate and to said precisely timed voltage pulses, the output of said divider circuit being applied to said phantastron circuit to provide the trigger for triggering off said phantastron circuit, to a coincidence and trigger generator circuit to provide a second range pulse output in response to said second selector voltage gate and to the pulse of said divider circuit output occurring coincident in time with said second selector voltage gate, and to a coincidence, shaping, and trigger generator circuit to provide a modulator pulse output in response to said modulator selector voltage gate and to the pulse of said divider circuit output occurring coincident in time with said modulator selector voltage gate.

2. In a range unit for supplying an asynchronously repeated group of precisely timed voltage pulses to a radar system, a source of voltage pulses occurring at constant time intervals, a source of asynchronously repeated voltage pulses, means responsive to coincident precision pulses and asynchronous pulses to produce asynchronously repeated output pulses, means responsive to said output pulses to generate a first timing pulse coincident in time with one of said precision pulses and delayed in time with respect to said output pulse by a time interval containing an integral number of said precision pulses, means responsive to said output pulses to produce a second timing pulse coincident in time with one of said precision pulses and delayed in time with respect to said first timing pulse by a time interval corresponding to 5(N) precision pulses, and means responsive to said output pulse to produce a third timing pulse coincident in time with one of said precision pulses and delayed in time with respect to said first timing pulse by a time interval corresponding to 5(N+1) precision pulses, where N is any integer.

References Cited in the file of this patent

UNITED STATES PATENTS

| 2,183,966 | Lewis | Dec. 19, 1939 |
| 2,255,403 | Wheeler | Sept. 9, 1941 |
| 2,369,662 | Deloraine et al. | Feb. 20, 1945 |
| 2,414,477 | Meacham | Jan. 21, 1947 |
| 2,433,385 | Miller | Dec. 30, 1947 |
| 2,512,152 | Haworth et al. | June 20, 1950 |
| 2,636,165 | Hulsizer et al. | Apr. 21, 1953 |
| 2,669,711 | Moore | Feb. 16, 1954 |
| 2,671,896 | De Rosa | Mar. 9, 1954 |

FOREIGN PATENTS

| 510,881 | Great Britain | Aug. 8, 1939 |